United States Patent
Shedlock et al.

(10) Patent No.: US 12,360,065 B2
(45) Date of Patent: Jul. 15, 2025

(54) BACKSCATTER IMAGING SYSTEM

(71) Applicant: Varex Imaging Corporation, Salt Lake City, UT (US)

(72) Inventors: Daniel Shedlock, Knoxville, TN (US); David T Nisius, Des Plaines, IL (US)

(73) Assignee: VAREX IMAGING CORPORATION, Salt Lake City, UT (US)

(*) Notice: Subject to any disclaimer, the term of this patent is extended or adjusted under 35 U.S.C. 154(b) by 349 days.

(21) Appl. No.: 17/737,392

(22) Filed: May 5, 2022

(65) Prior Publication Data
US 2022/0357289 A1 Nov. 10, 2022

Related U.S. Application Data

(60) Provisional application No. 63/184,761, filed on May 5, 2021.

(51) Int. Cl.
| | |
|---|---|
| *G01N 23/203* | (2006.01) |
| *G01N 23/04* | (2018.01) |
| *G01N 23/20* | (2018.01) |
| *G01T 1/20* | (2006.01) |

(52) U.S. Cl.
CPC ........ *G01N 23/203* (2013.01); *G01N 23/04* (2013.01); *G01N 23/20083* (2013.01); *G01T 1/20* (2013.01); *G01T 1/2006* (2013.01); *G01N 2223/053* (2013.01); *G01N 2223/316* (2013.01)

(58) Field of Classification Search
CPC ....... G01T 1/20; G01T 1/2006; G01N 23/203; G01N 23/04; G01N 23/20083
See application file for complete search history.

(56) References Cited

U.S. PATENT DOCUMENTS

| | | | |
|---|---|---|---|
| 6,282,260 B1 * | 8/2001 | Grodzins | G01V 5/222 378/86 |
| 7,224,772 B2 | 5/2007 | Jacobs et al. | |
| 9,036,781 B1 * | 5/2015 | Safai | G01N 23/00 378/86 |
| 10,459,091 B2 | 10/2019 | Shedlock et al. | |

(Continued)

FOREIGN PATENT DOCUMENTS

| | | | | |
|---|---|---|---|---|
| DE | 102008036449 A1 * | 2/2010 | | G01T 1/20 |
| EP | 0046009 A1 * | 2/1982 | | G01T 1/36 |

(Continued)

OTHER PUBLICATIONS

Int'l Appl. No. PCT/US2021/027829, International Search Report dated Aug. 8, 2022.

(Continued)

*Primary Examiner* — David P Porta
*Assistant Examiner* — Casey Bryant
(74) *Attorney, Agent, or Firm* — Dorsey & Whitney LLP

(57) ABSTRACT

An x-ray system, comprising: a backscatter detector, comprising: an x-ray conversion material; a plurality of sensors configured to generate electrical signals in combination with the x-ray conversion material in response to incident x-rays; and a collimator disposed on the x-ray conversion material and including a plurality of partitions extending away from the x-ray conversion material and the sensors and forming a plurality of openings, each opening corresponding to one of the sensors.

20 Claims, 12 Drawing Sheets

(56) References Cited

U.S. PATENT DOCUMENTS

| | | | |
|---|---|---|---|
| 2004/0264628 A1* | 12/2004 | Besson | G21K 1/10 378/5 |
| 2008/0219404 A1 | 9/2008 | Moore | |
| 2010/0034345 A1* | 2/2010 | Heismann | G01T 1/20 378/19 |
| 2011/0235777 A1* | 9/2011 | Gozani | G01N 23/083 378/53 |
| 2011/0309253 A1 | 12/2011 | Rothschild | |
| 2012/0114102 A1* | 5/2012 | Chapman | G01N 23/203 378/87 |
| 2013/0208857 A1* | 8/2013 | Arodzero | G01T 1/2008 378/57 |
| 2014/0341341 A1 | 11/2014 | Gozani et al. | |
| 2015/0377803 A1* | 12/2015 | Turner | G01N 23/203 378/41 |
| 2023/0288350 A1* | 9/2023 | Chen | G01V 5/222 |

FOREIGN PATENT DOCUMENTS

| | | | |
|---|---|---|---|
| EP | 0212836 A1 * | 7/1986 | G01T 1/202 |
| EP | 2667184 | 11/2013 | |
| JP | 2008-224624 | 9/2008 | |
| JP | 5661325 | 1/2015 | |
| WO | 92/03900 | 3/1992 | |
| WO | 2012/174265 | 12/2012 | |
| WO | WO-2018005940 A1 * | 1/2018 | G01T 1/1644 |
| WO | 2021016746 A1 | 2/2021 | |
| WO | WO-2022235903 A1 * | 11/2022 | G01N 23/04 |

OTHER PUBLICATIONS

Int'l Appl. No. PCT/US2021/027829, Written Opinion dated Aug. 8, 2022.

B. Juneja, F. Bova, E. Dugan, D. Shedlock, "Backscatter Imaging: Obtaining Images at Multiple Depths From a Single View", AAPM 54th Annual Meeting, 2012.

T. Jackson, D. Hollenbach, & D. Shedlock, "Investigation of Backscatter X-ray Imaging Techniques for Uranium Dioxide Fuel Rods," Research in Nondestructive Evaluation, 22:4, 231-247, Oct. 2011.

Y. Pan, D. Shedlock, T. Chu, "Detection of Defects in Carbon-Carbon Composites using X-ray Compton Backscatter Radiography: Lateral Migration Radiography", ASNT Fall Quality, Nov. 2010.

T. Edwards, C.H. Toh, D. Shedlock, "X-ray Backscatter Imaging for Aerospace Applications—Technical Paper", Quantitative Nondestructive Evaluation, 2011.

D. Shedlock, T. Edwards, G. Georgeson, M. Safai, "X-ray Backscatter Imaging for Aerospace Applications", Nondestructive Evaluation of Aerospace Materials and Structures II, May 2010.

D. Shedock, "X-Ray Backscatter Imaging For Radiography By Selective Detection And Snapshot: Evolution, Development, And Optimization" Ph.D. Dissertation, University of Florida, Aug. 2007.

D. Shedlock, E. T. Dugan, A. M. Jacobs, L. Houssay, "Preliminary Measurements Supporting Reactor Vessel and Large Component Inspection Using X-Ray Backscatter Radiography by Selective Detection," Proceedings of 2006 International Congress on Advances in Nuclear Power Plants ICAPP, Reno, Jun. 2006.

D. Shedlock, B. Addicott, E. Dugan, and A. Jacobs, Optimization of a RSD X-Ray Backscatter System for Detecting Defects in the Space Shuttle External Tank Thermal Foam Insulation, SPIE Transactions, Aug. 2005.

E. Dugan, A. Jacobs, D. Shedlock, and D. Ekdahl, Detection of Defects in Foam Thermal Insulation Using Lateral Migration Backscatter X-ray Radiography, SPIE Transactions, Aug. 2004.

European Appl. No. 22171857.0, Search Report dated Jan. 16, 2023 (15 pages).

* cited by examiner

BACKSCATTER IMAGING SYSTEM

X-ray backscatter may be used for a variety of applications, such as cargo screening and nondestructive testing (NDT) applications. Conventional x-ray backscatter systems for cargo scanning currently use kilovolt (kV) x-ray tubes, typically 225-450 kV x-ray systems. As a result, both a kV x-ray source and a megavolt (MV) x-ray source are used for cargo screening of material when using both transmission and backscatter detection.

DETAILED DESCRIPTION

X-rays from an x-ray source may be directed towards an object. An image may be generated based on the x-rays that are transmitted through the object. Some of the x-rays may be absorbed by the object or continue through the object. Other x-rays may scatter from the object in a variety of directions depending on characteristics of the object. The remaining x-rays may be detected by a detector on the opposite side of the object from the x-ray source and used to generate an image. A different x-ray detector may be positioned relative to the x-ray source and the object to detect the scattered x-rays.

Detection of backscattered may have benefits over transmission detection alone. For transmission detection, a relatively thick low-density material may appear the same as a relatively thin high-density material. However, such materials may have different scattering coefficients. The use of backscatter detection may allow these materials to be differentiated.

Figure 1A:
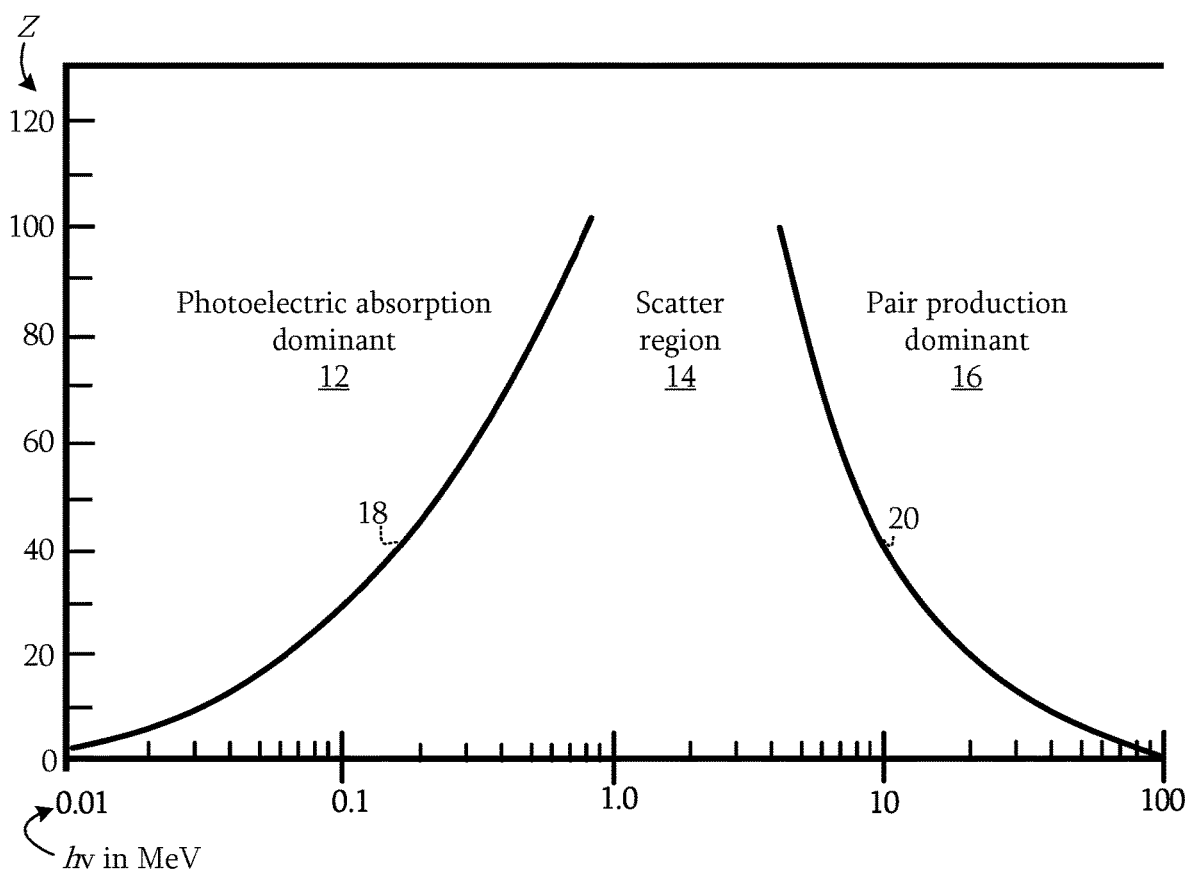
FIG. 1A is a chart of radiation interaction distributions as a function of material atomic number and radiation energy.

FIG. 1A is a chart of radiation interaction distributions as a function of material atomic number and radiation energy. The vertical axis corresponds to atomic number Z and the horizontal axis corresponds to radiation energy (hv in megaelectron volts (MeV) on a logarithmic scale). In region 12, photoelectric absorption is the dominant interaction with matter. In region 14, Rayleigh and Compton scattering are the dominant interaction. In region 16, absorption due to electron-positron pair production is dominant. Line 18 represents the combination of atomic number Z and energy where the probability of photoelectric absorptions is equal to the probability of scattering. Similarly, line 20 represents the combination of atomic number Z and energy where the probability of absorption due to electron-positron pair production is equal to the probability of scattering.

Figure 1B:
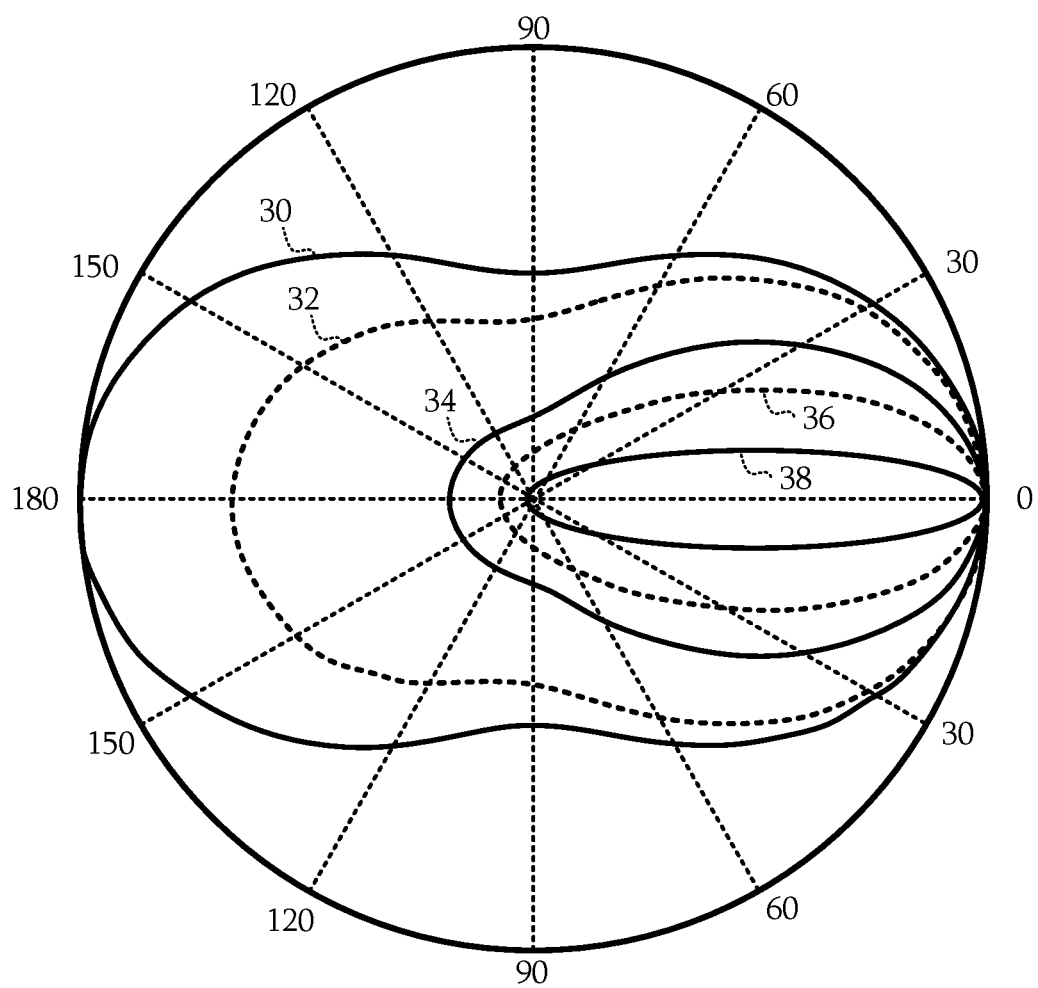
FIG. 1B is a polar graph of scattering-angle cross sections for a range of radiation energies.

FIG. 1B is a polar graph of Klein-Nishina scattering-angle cross sections for a range of radiation energies. Zero degrees is a direction parallel to and in the same direction as the incident radiation. Curves 30, 32, 34, 36, and 38 represent scattering angle cross-sections for 2.75 electron volts (eV), 60 keV (kiloelectronvolts), 511 keV, 1.46 megaelectronvolts (MeV), and 10 MeV, respectively.

Some embodiments relate to backscatter imaging systems using a megavolt (MV) x-ray source. As will be described in further detail below, a backscatter detector may be used with a MV x-ray source to generate a backscatter scan or image. In some embodiments, when the MV x-ray source is used to generate a transmission scan, the backscatter scan may be performed simultaneously. Moreover, an additional kilovolt (kV) x-ray source is not needed as the backscatter detector may use the scattered photons from the MV x-ray source. Some embodiments may relate to backscatter imaging systems using kV x-ray sources.

Figure 2A:
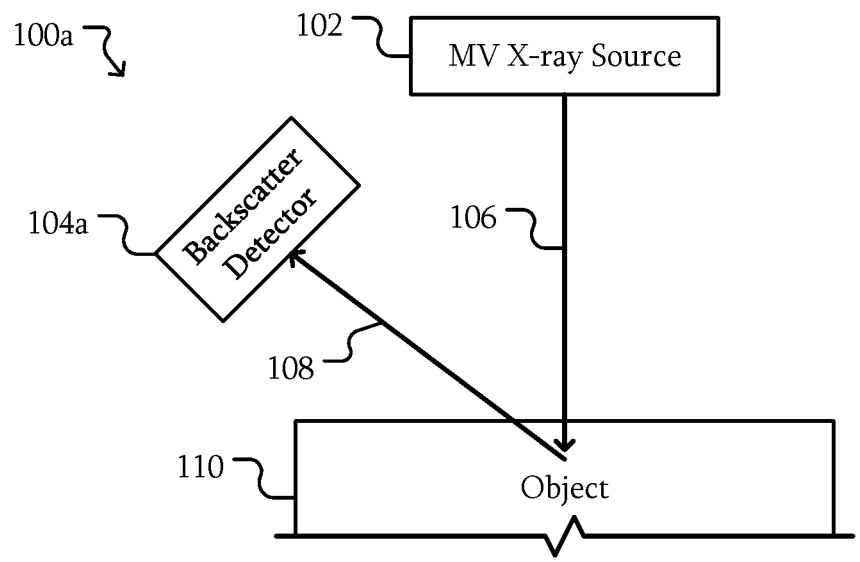
FIGS. 2A-2B are block diagrams of backscatter imaging systems according to some embodiments.
Figure 2B:
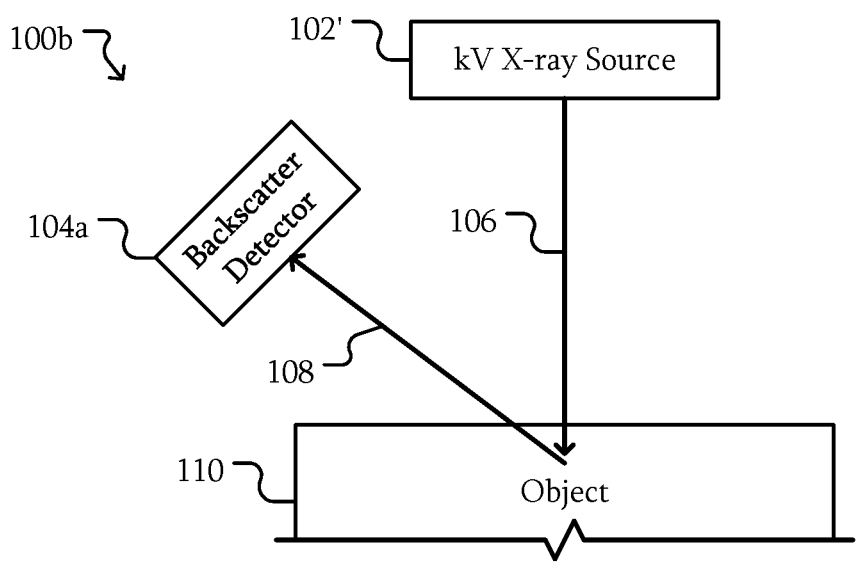

FIG. 2A-2B are block diagrams of backscatter imaging systems according to some embodiments. Referring to FIG. 2A, the backscatter imaging system 100a includes an MV x-ray source 102 and a backscatter detector 104a. The MV x-ray source 102 may be configured to generate energies above 1 MeV. In some embodiments, the energies may be greater than 4 MeV, 6 MeV or more. While the incident radiation 106 may have energies in the MeV range, the spectrum of the radiation 106 may also include lower energies.

Figure 9:
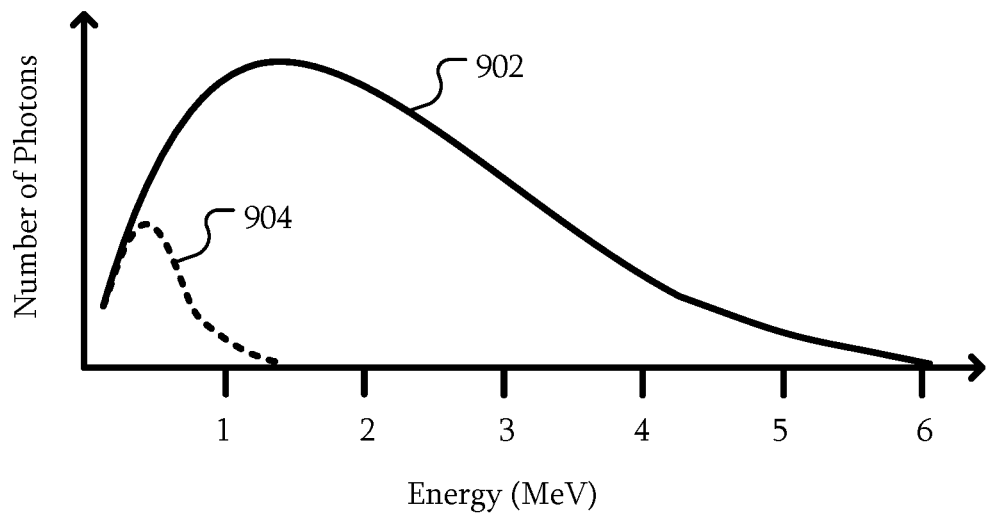
FIG. 9 is a chart of an energy spectrum from a 6 megavolt (MV) x-ray source.

In particular, an MV x-ray source 102 may still result in significant backscatter 108 at lower energies. FIG. 9 is a chart of an energy spectrum from a 6 MV x-ray source. The solid line 902 illustrates the energy spectrum of the 6 MV x-ray source while the dashed line 904 illustrates the energy spectrum of the backscatter radiation. Referring to FIGS. 2A and 9, a significant portion of the Bremsstrahlung spectrum for a 6 MV x-ray source 102 is below 600 keV. For an unfiltered 6 MV spectrum, the MV x-ray source 102 emits approximately 25% of the photons with energies below 600 keV. X-ray backscatter 108 from a 6 MV Bremsstrahlung spectra source likely has more than 98% of x-ray backscatter signals below 600 keV. Referring to FIG. 1B, beyond 600 keV the scatter angle of Compton scattered photons is primarily forward. (Curve 34 shows the scattering for 511 keV.) This significantly reduces the probability that photons with energies beyond 600 keV backscatter to form an image. In particular, the amount of backscatter may be greater than ½ at lower energies, such as 2.75 eV through 60 keV (between curves 30 and 32), may decrease to greater than ⅙ at about 511 eV (curve 34), may fall to greater than 1/12 at about 1.46 MeV (curve 36), and may approach negligible values at 10 MeV (curve 38) and above.

Referring to FIG. 2A, in some embodiments, the MV x-ray source 102 includes a linear accelerator, betatron (cyclic particle accelerator), rotatron (lemniscate [figure-8 type] trajectory particle accelerator), or the like. However, the MV x-ray source 102 may include any x-ray source capable of generating x-rays or photons at energies above 1 MeV. In some embodiments, the MV x-ray source 102 may be configured to generate a fan beam. The fan beam may include an emission volume having a cross-section with a width to height/length aspect ratio of about 3:1 or greater. In some embodiments, the MV x-ray source 102 may be configured to generate a pencil beam, i.e., a beam having a cross-section with an aspect ratio between about 2:1 and 1:2. The MV x-ray source 102 may be configured to scan the pencil beam to approximate a fan beam over time.

In some embodiments, the MV x-ray source 102 may include an interlaced MV x-ray source, a multiple energy MV x-ray source, or the like. The multiple energies may allow material discrimination to be performed on materials on the MV x-ray source 102 side of the object 110 being scanned. As will be described in further detail below, once the backscatter signals generated from these materials are received, the backscatter signals can be "subtracted" from transmission signals received through the object 110. This operation may improve transmission x-ray material identification by improving the material discrimination for the transmission radiograph. That is, the transmission radiograph includes both information based on materials that generated the backscatter signals and information based on materials behind those materials. By reducing or removing the effect of the materials that generated the backscatter signals in the transmission radiograph, the remaining materials may be more easily identified.

In some embodiments the backscatter detector 104a includes a linear detector array. The backscatter detector 104a may include a series of sensors disposed in a one-dimensional line corresponding to a direction of the largest dimension of the fan beam or the scan direction of the MV x-ray source 102. In an example, the backscatter detector 104a may employ multiple series of one dimensional (1D) detectors, such as strip detectors, linear detectors, or the like, focused at different depths for depth information. As will be described in further detail below with respect to FIG. 7, the 1D detectors may be focused at different depths by changing the angle of the detector relative to the incident radiation 106, positioning the 1D detector at a different location, or the like such that the intersection of the incident radiation 106 and the direction the 1D detector is pointed is at a different depth. For example, a 1D detector may be rotated to have a smaller angle relative to the incident radiation 106 or translated to be closer to the object 110. This change will result in backscatter signals from deeper within the object 110 to be received by the 1D detector. If additional 1D detectors are focused at the same depth, it can used improve signal-to-noise ratio (SNR or signal to noise ratio) and contrast-to-noise ratio (CNR) at the same scanning speed or improve scanning speed.

The backscatter detector 104a may include shielding, scintillators, collimators sensors, or the like that is appropriate for the expected incident radiation from sources such as direct backscattered radiation, direct leakage from the MV x-ray source 102, scattered leakage or other radiation, or the like. As will be described in further detail below, the backscatter detector 104a may take a variety of forms with components that, in various combinations, reduce an impact of undesired radiation.

Conventional backscatter imaging systems are configured to operate with a 225 kV x-ray source. Some conventional backscatter imaging systems may use a 450 kV x-ray source. However, MV x-rays sources have not been used backscatter imaging systems. In particular, MV x-ray sources have been conventionally considered as having too much of the energy spectrum in energies with a reduced amount of backscatter. As described above, energies at about 1 MeV and above have a significantly reduced backscatter relative to those below 1 MeV.

However, the bremsstrahlung spectrum of a MV x-ray source 102 still has a significant portion at energies lower than 1 MeV. For example, a 6 MV x-ray source 102 may include about 25% of the total energy in energies below 600 keV. Thus, a portion of the spectrum of a MV x-ray source 102 may have energies where a sufficient amount would backscatter to enable imaging using those backscattered photons. However, with the higher energy MV x-ray source 102, more photons may be scattering (or reaching the backscatter detector), including leakage from the MV x-ray source 102 itself. That leakage may include higher energy photons. In addition, with a MV x-ray source 102, the same photons may be striking multiple surfaces (or scattering multiple times and coming from different directions). Such background radiation may not be present when using a kV x-ray source as the initial photon energy is much less. Accordingly, a conventional backscatter x-ray detector may be unsuited for a system with a MV x-ray source 102. In some embodiments, the backscatter detector 104a includes structures, components, or the like that mitigate this unwanted background radiation, including background radiation unique to the MV x-ray source 102. A variety of these structures will be described in further detail below.

In some embodiments, the backscatter detector 104a may be configured to accept lower energy photons and reject higher energy photons according to a threshold. For example, the threshold may be about 300 keV, 450 keV, 600 keV, 1 MeV, or the like. The threshold may be a point at which the relative acceptance and rejection of the photons at the energy level of the threshold are about equal. Accordingly, if the higher energy photons higher than the threshold are rejected more so than the lower energy photons below the threshold, a probability that photons that are backscattered from the object 110 (lower energy photons) are detected may be increased while a probability that photons from leakage (higher energy photons) are detected may be decreased. As will be described in further detail below, the structure of the backscatter detector 104a, energy discrimination performed by the backscatter detector 104a, or the like may be used to affect the relative acceptance and rejection of the photons by energy level.

The object 110 may be a variety of structures. For example, the object 110 may include cargo that is moving relative to the backscatter imaging system 100a, such as an object on a conveyor belt or a railway vehicle. In other embodiments, the object 110 may include an insulated pipe. While particular objects 110 have been used as examples, the object 110 may include any object 110 on which a backscatter scan may be performed. As will be described in further detail below, in some embodiments a transmission scan of the object 110 may be performed in addition and potentially simultaneously as the backscatter scan.

In some embodiments, a backscatter imaging system 100a including the backscatter detector 104a may be part of a mobile system. For example, the backscatter imaging system 100a may be part of an insulated pipe scanning system that moves relative to the insulated pipe. While an insulated pipe scanning system has been used as an example, the backscatter imaging system 100a may be used in other types of mobile systems.

Referring to FIG. 2B, in some embodiments, the x-ray system 100b may be similar to the x-ray system 100a. However, the x-ray system 100b includes a kV x-ray source 102' configured to generate photons having energies less than 1 MeV.

Figure 3:
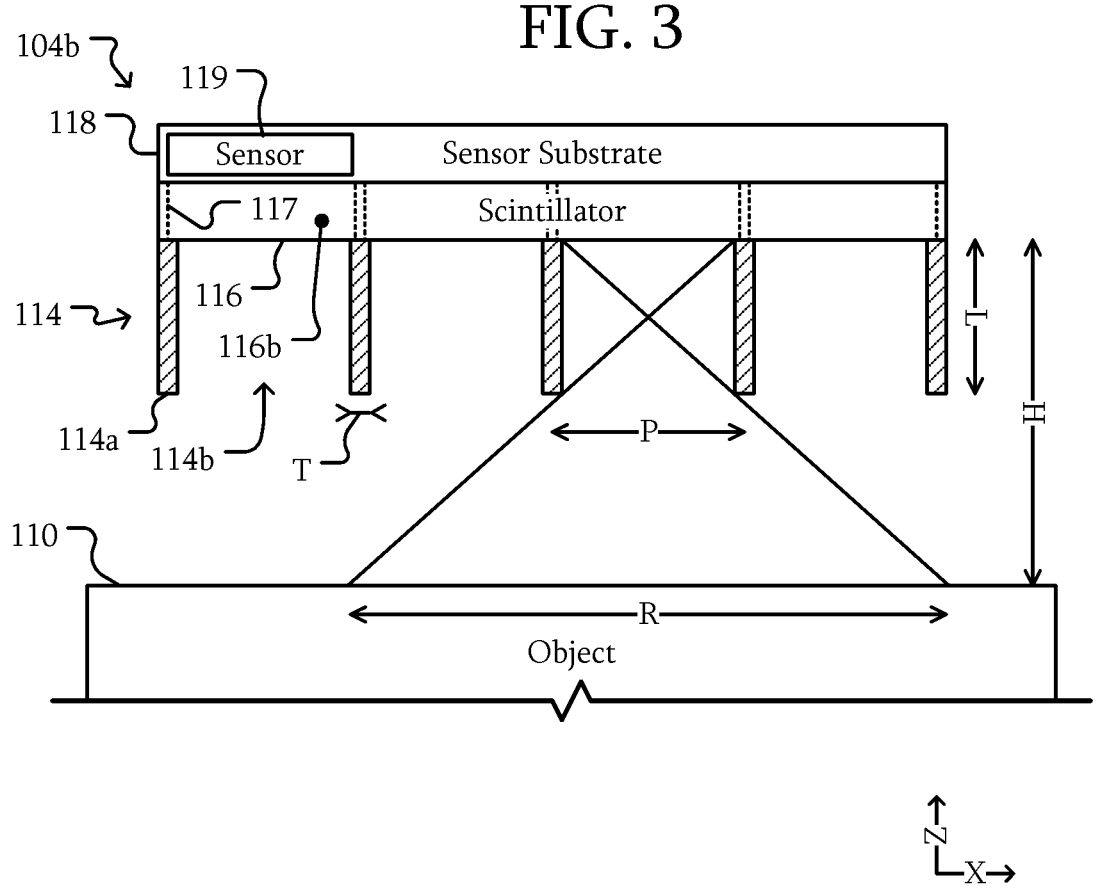
FIG. 3 is a block diagram of a backscatter detector according to some embodiments.

FIG. 3 is a block diagram of a backscatter detector according to some embodiments. The backscatter detector 104b may be similar to the backscatter detector 104a and may be used in a system similar to the backscatter detector 104a of the backscatter imaging system 100a/100b as described with respect to FIGS. 2A-2B. In some embodiments, the backscatter detector 104b includes a collimator 114, a scintillator 116, and a sensor substrate 118 including multiple sensors 119.

The collimator 114 includes partitions 114a that form openings 114b. The openings 114b correspond to sensors 119 of the sensor substrate 118. For clarity, only one sensor 119 is illustrated. In some embodiments, the openings 114b correspond to sensors 119 of the sensor substrate 118 on a 1:1 basis. The collimator 114 is disposed on a surface of the scintillator 116. The collimator 114 extends away from the surface of the scintillator 116 in a direction towards expected radiation (the positive Z axis in this illustration). Although the collimator 114 is illustrated as being disposed directly on the scintillator 116, in other embodiments, other intervening layers may be between the collimator 114 and the scintillator 116.

The scintillator 116 may include a variety of materials configured to convert x-ray photons into photons detectable by the sensors 119 of the sensor substrate 118. For example, the scintillator may include cesium iodide (CsI), cadmium tungstate ($CdWO_4$), polyvinyl toluene (PVT), or the like. Other examples of the scintillator include gadolinium oxysulfide ($Gd_2O_2S$; GOS; Gadox), gadolinium oxysulfide doped with terbium ($Gd_2O_2S$:Tb), or the like.

A thickness of the scintillator 116 may be about 5 mm to about 60 mm depending on the material. For example, a thickness of a PVT scintillator 116 may be about 25 mm to 50 mm. A thickness of a $CdWO_4$ scintillator 116 may be about 1.5 mm to about 7 mm. A thickness of a CsI scintillator 116 may be about 5 mm to 17 mm.

In some embodiments, the thickness of the scintillator 116 is based on converting the expected backscatter radiation and not converting or converting a smaller percentage of other radiation. For example, the thickness of the scintillator 116 in the Z direction affects the conversion of backscattered photons having energies less than about 1 MeV where more material results in more conversion. However, the thickness of the scintillator 116 for backscattered photons having energies less than about 1 MeV may be less than a thickness that may convert photons having energies above 1 MeV into a sufficiently detectable signal. For example, for detection of photons having energies above 1 MeV, a $CdWO_4$ scintillator may have a thickness of at least about 30 mm. However, a $CdWO_4$ scintillator 116 for the backscatter detector 104b may have a thickness of about 2.5 to 7 mm. As a result, the $CdWO_4$ scintillator 116 may be thick enough to convert a sufficient amount of photons below 1 MeV but also thin enough to not convert as many photons above 1 MeV. Similarly, a CsI scintillator may have a thickness of at least about 40 mm for a sufficiently detectable signal from photons having energies above 1 MeV. A CsI scintillator 116 having a thickness of about 7 mm to 17 mm may have a similar effect of having a thickness thick enough to convert the desired lower energy photons while converting less of the higher energy photons. In some embodiments, the thickness of the scintillator 116 may be based on a desired conversion efficiency of incident photons in a desired energy range. For example, in some embodiments, the thickness of the scintillator may be a thickness that allows for conversion of about 55% to about 75% of photons within an energy range from about 600 keV to about 1 MeV. In some embodiments, the conversion of photons above about 1 MeV may be less than 50%. In some embodiments, the thickness may be based on a desired energy range for the backscattered photons. For example, for a desired energy range of 600 keV and below, the thickness of a $CdWO_4$ scintillator 116 may be about 1.5 to 4 mm while a thickness of a CsI scintillator 116 may be about 5 mm to 11 mm.

In some embodiments, the backscatter detector 104b includes the collimator 114 that is particular to the application. Here, an object 110 is illustrated relative to the backscatter detector 104. The dimensions of the collimator 114 may depend on the particular application. H is the distance from the scintillator 116 to the object 110. L is the length of the partitions 114a of the collimator 114 from the scintillator towards the object 110. P is the pitch of the partitions 114a. Conventionally, pitch refers to the imaging area (e.g., pixel) length or width (in the x-y plane) along with the spacing between imaging areas (or pixels). R is the approximate resolution on the object 110. In an example, the resolution may be about 2 mm to 10 mm.

In some embodiments, H is about 550 millimeters (mm). The pitch P may be about 3 mm. The length L of the partitions 114a may be about 250 mm. The resolution R may be about 6.1 mm. Accordingly, a distance from the object 110 to the backscatter detector 104a may be about 300 mm (about 11.8 inches or approximately 12 inches). The various parameters above are an example. In other embodiments, the parameters may be different based on a different required resolution R, a different permitted acquisition time that may affect the size of the pixels or the pitch P, or the like. For example, a cargo screening application may use a larger resolution with a shorter acquisition time, and an NDT application may use a smaller resolution with a longer acquisition time.

In some embodiments, the relationship may be defined by Equation 1.

$$R = \frac{PH}{L} - \frac{1}{2} \tag{1}$$

In some embodiments, the selection of the dimensions of the collimator 114 and, in particular, the pitch P and the length L may be made, at least in part, based on the expected level of background radiation, such as leakage from the x-ray source, scatter object or surroundings, elevated natural background radiation, or the like.

In some embodiments, the relative position, the dimensions of the collimator 114, or the like may result in a resolution that is about 5 mm or less. Conventional high speed security and cargo backscatter x-ray detector may have a resolution of about 10 mm or more. In addition, the backscatter x-ray detector 104b may detect higher energy backscattered photons that have deeper penetration within the object 110 as the higher energy backscattered photons may exit the object 110 without being absorbed. The penetration may be about 5 to 6 mm or more while a penetration of a conventional backscatter system may be about 2-3 mm. In some embodiments, both the penetration higher energy backscattered photons and the image resolution may be better.

In some embodiments, a thickness T of the partitions 114a may be based on an expected backscatter energy spectrum. For example, the thickness T may be selected to substantially reduce photons outside of the field of view of a portion of the scintillator 116 between partitions 114a. In some embodiments, the reduction may be enough such that the signal to noise ratio remains above 10 or more.

In some embodiments, the distance of the backscatter detector 104a to the object 110, such as the distance H of FIG. 3, may be about 300 mm or less. If the backscatter detector 104a is further away, the probability that the amounts of the received backscatter from the object 110 become comparable to the noise or leakage may increase to the point that the system does not function. For example, in some systems using source greater than 1 MV, when a distance of the backscatter detector 104a from the object 110 is greater than about 300 mm, the SNR can be less than 10.

In some embodiments, the scintillator 116 includes septa 117 separate from the collimator 114. The septa 117 are configured to block photons generated due to interactions between the x-rays and the material of the scintillator 116 from affecting adjacent pixels of the sensor substrate 118. For example, x-rays that enter one opening 114b may enter a corresponding region 116b of the scintillator 116 defined by the septa 117. The x-rays interacting with the material of the scintillator 116 may generate light that propagates in all directions from the point of interaction. Light that may otherwise enter an adjacent region 116b of the scintillator 116 and be detected by an adjacent sensor 119 of the sensor substrate 118 will instead be blocked by the septa 117.

The septa 117 may be present in other embodiments including the scintillator 116; however, the septa 117 are omitted from the figures for clarity. Similarly, the sensors 119 may be present in the sensor substrates 118 described below, but are omitted from the figures for clarity.

Figure 4A:
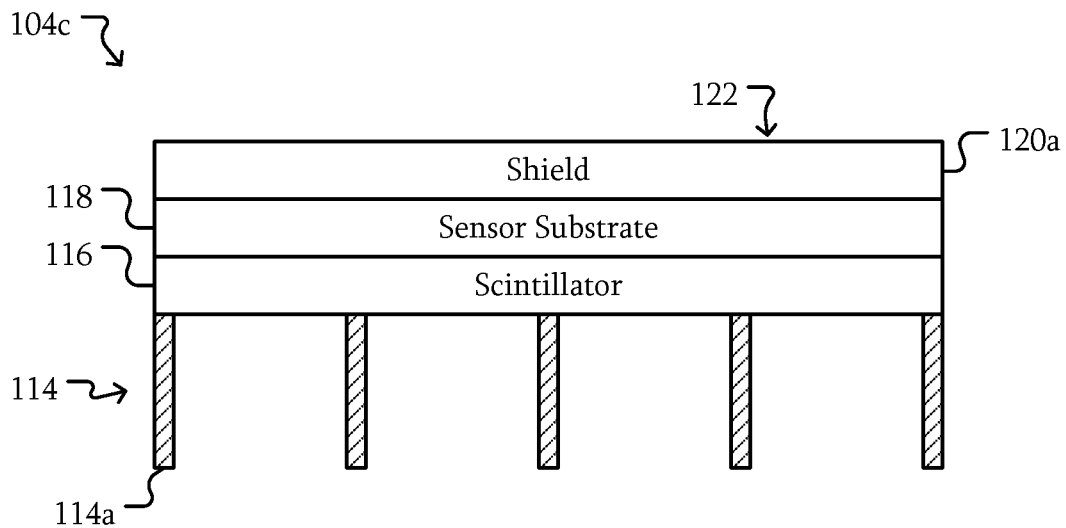
FIG. 4A is a block diagram of a backscatter detector with shielding according to some embodiments.

FIG. 4A is a block diagram of a backscatter detector with shielding according to some embodiments. The backscatter detector 104c may be similar to the backscatter detectors 104a-b described above and used in similar systems such as the backscatter imaging system 100a. In some embodiments, the backscatter detector 104c may include a shield 120a. The shield (or back shield) 120a may be disposed on a back side 122 of the backscatter detector 104c. In other embodiments, a shield similar to the shield 120a may be disposed on other portions of the backscatter detector 104b in a position that would likely receive leakage radiation from the MV x-ray source 102.

In a particular example, an expected amount of particles received from the backscatter from the object 110 relative to the amount from a 6 MV x-ray source 102 may be about 3×10$^{-5}$ or more relative to the particles from the 6 MV x-ray source 102. A thickness, type, material, or the like of shielding may be added to reduce an expected radiation from leakage to about 1×10$^{-6}$ or less. In some embodiments, the amount of shielding may be based on a number of orders of magnitude difference between the expected signal from the backscattered photons to the leakage photons that pass through the shield 120. In the example above, the leakage was about one order of magnitude (e.g., 10 times) less than the expected backscatter signal.

The shield 120a may include a variety of materials. For example, the shield 120a may include copper, brass, lead, aluminum, or the like. The shield 120a and other shields described herein may include a material and thickness suitable to the desired range of energies to be reduced. For example, the material may have an atomic number greater than 74 (e.g., Z≥tungsten (W)) and a thickness greater than 100 mm (or a thickness between 100 mm and 250 mm).

Figure 4B:
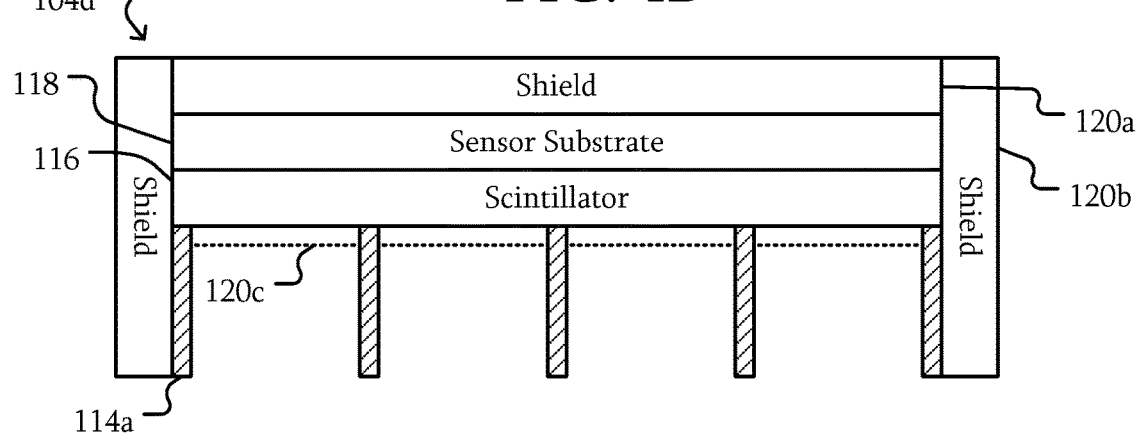
FIG. 4B is a block diagram of a backscatter detector with shielding according to some other embodiments.

FIG. 4B is a block diagram of a backscatter detector with shielding according to some other embodiments. The backscatter detector 104d may be similar to the backscatter detectors 104a-c described above and used in similar systems such as the backscatter imaging system 100a. However, the backscatter detector 104c may include a shield (or side shield) 120b disposed on a side or sides of the backscatter detector 104c. The shield 120b may include a material similar to the shield 120a. The shield 120b may be configured to reduce photons having energies lower than about 1 MeV, reduce photons higher than 1 MeV due to leakage, or the like. As described above, the detection efficiency for higher energy photons above 1 MeV may be less. Thus, the shield 120b may be configured based on the effectiveness for lower energy photons below 1 MeV. However, the shield 120b may also be configured to reduce photons with energies above 1 MeV, such as when a support structure for the backscatter detector 104d may accommodate the increased weight. In some embodiments, the shield 120b may act as a filter configured to reduce photons having energies less than about 60 keV entering the backscatter detector 104c from a direction perpendicular to the desired backscatter radiation 108. For example, higher energy photons may lose energy as the photons scatter around the backscatter imaging system 100a. As a result, a number of lower energy photons may be scattering from directions other than the direction of the desired backscatter radiation 108 from the object 110. The shield 120b may reduce a probability of detection of such lower energy photons. In a particular example, the shield 120b may include copper with a thickness of about 1 to 3 mm. However, in other embodiments, a different material and thickness may be used.

In some embodiments, the backscatter detector 104d may include a filter 120c disposed on a side of the scintillator 116 configured to receive the backscatter radiation 108. The filter 120c may be configured to reduce photons having energies less than about 60 keV. However, the filter 120c may be configured to pass desired backscatter photons from the backscatter radiation 108 such as photons having energies above about 60 keV.

While the shield 120b has been described as being on a side of the backscatter detector 104d, in some embodiments, the shield 120b may be disposed on the backscatter detector 104d in a position that does not substantially intercept higher energy leakage photons from the MV x-ray source 102 directed towards the scintillator. Accordingly, the shield 120b may have a reduced thickness. In particular, as the scattered photons may be lower energy photons and likely less than the higher energy leakage photons, a lesser amount of shielding may be used for the shield 120b. As a result, the backscatter detector 104d may be lighter.

In some examples, a shield, such as the back shield 120a, side shield 120b, or other shield or filter, may be configured to reduce photons having energies greater than about 200 keV or greater than about 1 MeV. Alternatively, the MV x-ray source 102 (e.g., an accelerator) may be shielded to reduce leakage radiation, which can allow the thicknesses of such shields to be reduced. Generally, radiation not contributing to the image (e.g., signal) is considered noise (e.g., radiation leakage and room scatter) and shielding may be used to reduce noise.

Figure 5:
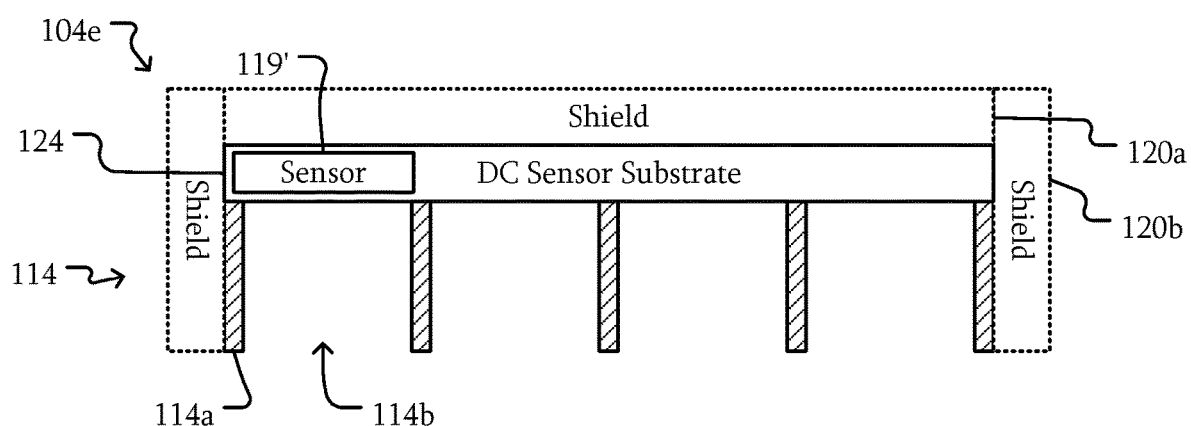
FIG. 5 is a block diagram of a direct conversion backscatter detector according to some embodiments.

FIG. 5 is a block diagram of a direct conversion backscatter detector according to some embodiments. The direct conversion backscatter detector 104e may be similar to the backscatter detectors 104a-d described above and used in similar systems such as the backscatter imaging system 100a/100b. However, the direct conversion backscatter detector 104e may not include a scintillator 116 and instead includes a direct conversion (DC) sensor substrate 124 including direct conversion sensors 119' including direct conversion materials. The direct conversion materials may include cadmium telluride (CdTe), cadmium zinc telluride (CdZnTe or CZT), selenium, or the like. The direct conversion detectors create electron-hole pairs. The electron-hole pairs are generated (and counted) by some sensor substrates from the detected photons. The number of electron-hole pairs generated are indicative of the incoming energy of the photons that created them. Thus, the direct conversion sensors 119' may be configured to generate electrical signals in combination with the x-ray conversion material in response to incident x-rays. The direct conversion sensors 119' may be associated with the openings 114b similar to the sensors 119 as described above.

In addition, the direct conversion sensor substrate 124 and the associated electronics (not illustrated) may be configured to discriminate based on energy. For example, the direct conversion sensor substrate 124 and the associated electronics may be configured to detect and reject signals based on photons having energies above a threshold, such as 600 keV, 1 MeV, or the like. As described above, photons with energies above such a threshold may have a reduced probability of being backscattered from the object 110 and are more likely to be leakage from the MV x-ray source 102. As a result, a signal to noise ratio of the direct conversion backscatter detector 104e may be increased.

In some embodiments, a collimator 114 may be used with the direct conversion sensor substrate 124. The collimator 114 may have substantially the same dimensions as described above with respect to the collimator 114 of FIG. 3. The collimator 114 may be mounted on a surface of the direct conversion sensor substrate 124, which includes the x-ray conversion material described above that create electron-hole pairs in response to incident x-rays.

In some embodiments, other components may be part of the direct conversion backscatter detector 104e. For example, the direct conversion backscatter detector 104e may include shielding the same as or similar to the shielding 120a, 120b, or the like described above. In some embodiments the shielding may be configured to reduce the detection of scattered photons having energies within a range of energies expected to be backscattered from the object 110 similar to the shield 120b. In some embodiments, a thicker shield 120a may be omitted as an effect of higher energy leakage photons from the MV x-ray source 102 may be reduced or eliminated through energy discrimination. However, the thinner shield or filter may still reduce scattered photons within the range of energies expected to be backscattered from the object 110 received from directions other than the desired region of the object 110.

In some embodiments, the direct conversion backscatter detector 104e may also include a back shield 120a and/or a side shield 120b. The back shield 120a and side shield 120b are illustrated with dashed lines as in some embodiments, the direct conversion backscatter detector 104e does not include the back shield 120a or side shield 120b.

Figure 6:
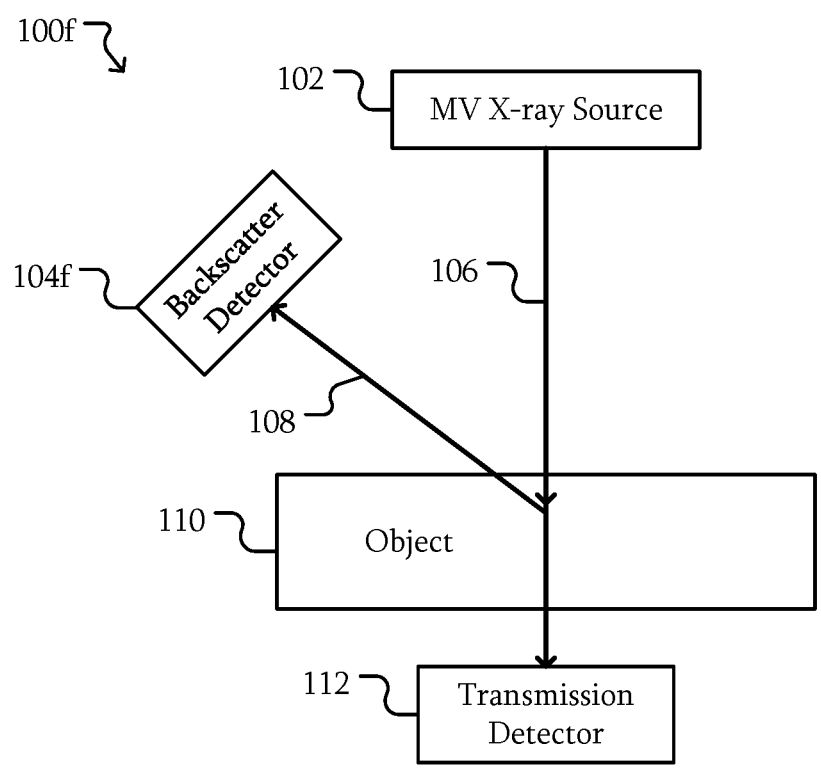
FIG. 6 is a block diagram of an x-ray system with backscatter and transmission detectors according to some embodiments.

FIG. 6 is a block diagram of an x-ray system with backscatter and transmission detectors according to some embodiments. In some embodiments, the backscatter imaging system 100f may be similar to the backscatter imaging system 100a described above. However, the backscatter imaging system 100f includes a transmission detector 112 in addition to a backscatter detector 104f. The backscatter detector 104f may be similar to the backscatter detectors 104a-e described above. The transmission detector 112 may be configured to receive the photons 106 transmitted through the object 110. These photons may include the high energy photons from the MV x-ray source 102 more so than the lower energy photons 108 that scatter towards the backscatter detector 104f. The high energy photons may be photons with energies above about 1 MeV. However, the transmission detector 112 may be configured to detect lower energy photons below about 1 MeV.

In some embodiments, data received from the backscatter detector 104 and the transmission detector 112 may be based at least in part on the same spatial area within the object 110. The data may be combined, such as by deconvolution, subtraction, or the like, to provide additional information about that spatial area of the object 110.

Figure 7:
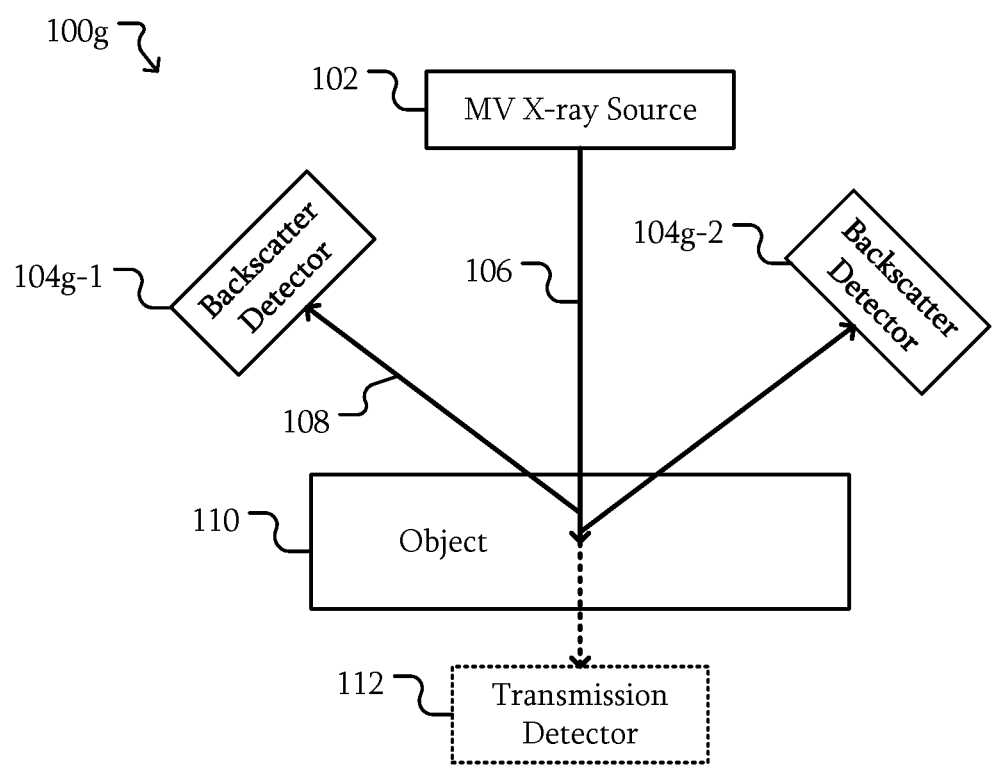
FIG. 7 is a block diagram of an x-ray system with multiple backscatter detectors according to some embodiments.

FIG. 7 is a block diagram of an x-ray system with multiple backscatter detectors according to some embodiments. In some embodiments, the backscatter imaging system 100g may be similar to the backscatter imaging systems 100a, 100b, and 100f. However, the backscatter imaging system 100g may include multiple backscatter detectors 104g. The backscatter detectors 104g may be similar to the backscatter detectors 104a-e described above. Each backscatter detector 104g may be directed towards a different location or the same location within the object 110. As a result, information from different depths within the object 110 may be obtained. Although two backscatter detectors 104g-1 and 104g-2 have been used as an example, in other embodiments, the number of backscatter detectors 104g may be different. In another example, information from different depths may be obtained from a single detector. Different lines or rows of a detector array (e.g., linear detector array or strip detector) may be used to sense different depth information. For example, the collimator 106 associated with the single detector may have partitions disposed such that each line or row of the array is pointed at a different depth within the object 110 as if the entire detector was pointed in that direction.

In the various embodiments described above, the shielding, type, or the like of the backscatter detector 104a-g may allow for receiving the desired backscatter photons 108 with a higher signal to noise ratio than other backscatter detectors. This increased performance may allow for the backscatter detectors 104a-g to be placed further away from the object 110 than with conventional kV sources while still maintaining an acceptable signal to noise ratio of one order of magnitude or more. Accordingly, the placement of the backscatter detector 104a-g may be more flexible, allow for greater clearance with the object 110, or the like.

Figure 8:
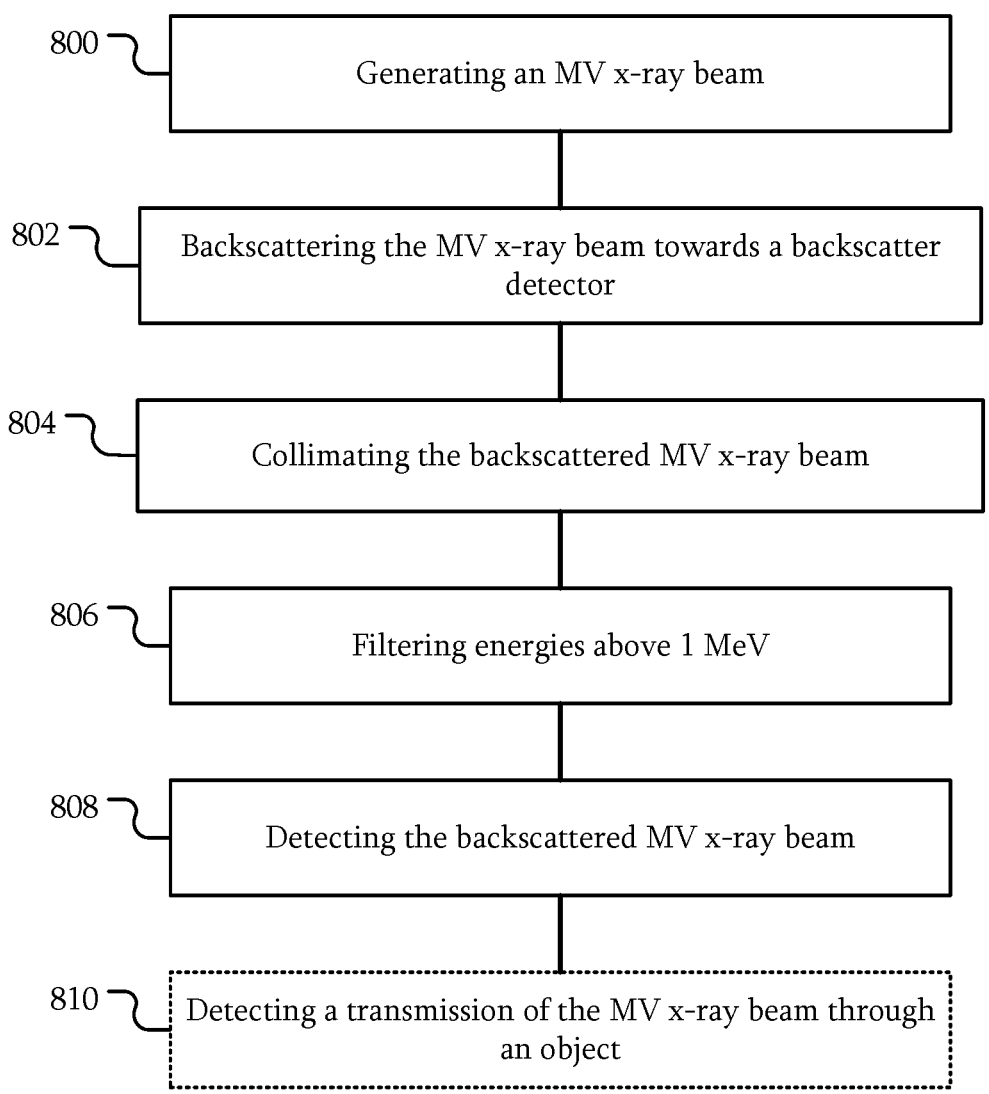
FIG. 8 is a flowchart of techniques of operating a backscatter imaging system according to some embodiments.

FIG. 8 is a flowchart of techniques of operating a backscatter imaging system according to some embodiments. The backscatter imaging system 100a of FIG. 2A will be used as an example, however, in other embodiments, different backscatter imaging systems 100 as described herein may be operated in a similar manner. Referring to FIGS. 2A, 3, and 8, in some embodiments, in 800, a MV x-ray beam 106 is generated. The MV x-ray beam may be generated by the MV x-ray source 102.

In 802, the MV x-ray beam is backscattered towards a backscatter detector. For example, materials of the target 110 may backscatter the backscattered MV x-ray beam 108 towards the backscatter detector 104a.

In 804, the backscattered MV x-ray beam 108 is collimated. For example, the backscattered MV x-ray beam 108 may be collimated by the collimator 114.

In 806, energies above 1 MeV are filtered at the backscatter detector. For example, the scintillator 116 may have a particular thickness to emphasize photons with energies below 1 MeV while deemphasizing energies above 1 MeV. Alternatively or in addition, a shield, such as shields 120a and/or 120b and filter 120c may be used to filter or reduce the quantity of the photons reaching the scintillator 116 due to source radiation leakage, room scatter, and other noise. In another example, the direct conversion sensor substrate 124 and the associated electronics may be used to remove the portion of the signal from the detected higher energy photons though energy discrimination. Each of these are examples of filtering the energies at the backscatter detector by different techniques.

In 808, the backscattered MV x-ray beam is detected. For example, the sensor substrate 118 or the direct conversion sensor substrate 124 may be used to detect the signal associated with the backscattered MV x-ray beam 108. In some embodiments, the detection of the MV x-ray beam may be performed in conjunction with the filtering in 806.

In 810, the MV x-ray beam transmitted through an object may be detected. For example, a transmission detector 112 may be used to detect the MV x-ray beam 106. In some embodiments, the detection of a transmitted MV x-ray beam in 810 is not performed.

Figure 10:
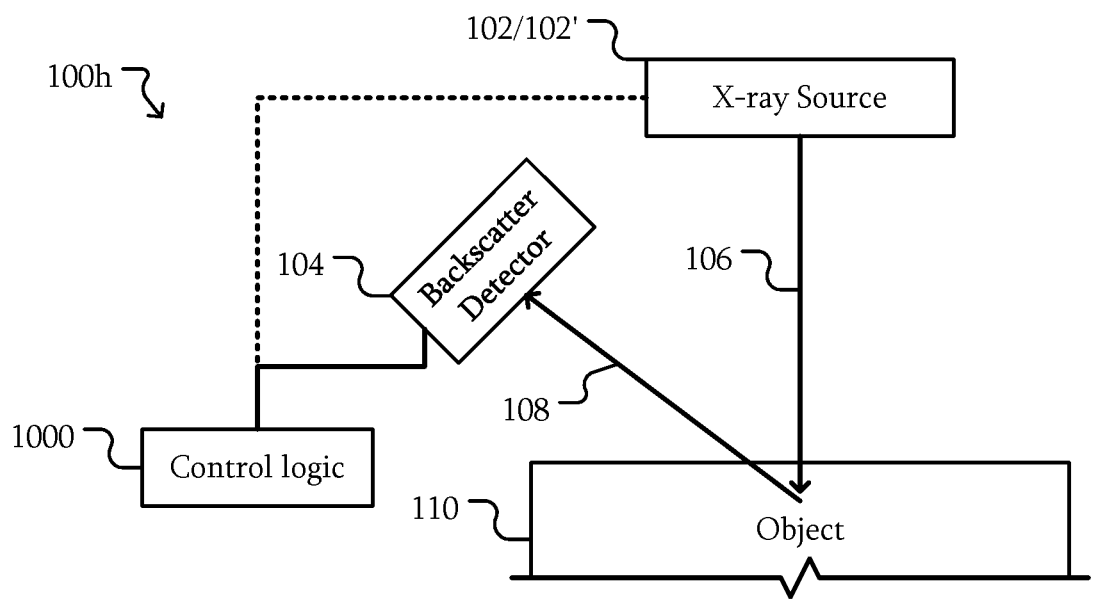
FIG. 10 is a block diagram of backscatter imaging system according to some embodiments.

FIG. 10 is a block diagram of backscatter imaging system according to some embodiments. The backscatter imaging system 100h may be similar to the imaging systems 100a-g described above. The backscatter imaging system 100h includes control logic 1000. The control logic 1000 may include a general purpose processor, a digital signal processor (DSP), an application specific integrated circuit (ASIC), a microcontroller, a programmable circuit device (e.g., field-programmable gate array (FPGA)), discrete circuits, a combination of such devices, or the like. In addition, other interface devices, such as circuit chipsets, hubs, memory controllers, communication interfaces, or the like may be part of the control logic 1000 to connect the control logic 1000 to internal and external components of the backscatter imaging system 100h. The control logic 1000 may be configured to perform the operations described above in conjunction with devices and systems described above such as the backscatter detector 104 (such as backscatter detectors 104a-g), the x-ray source 102/102', a transmission detector 112, or the like.

Figure 11:
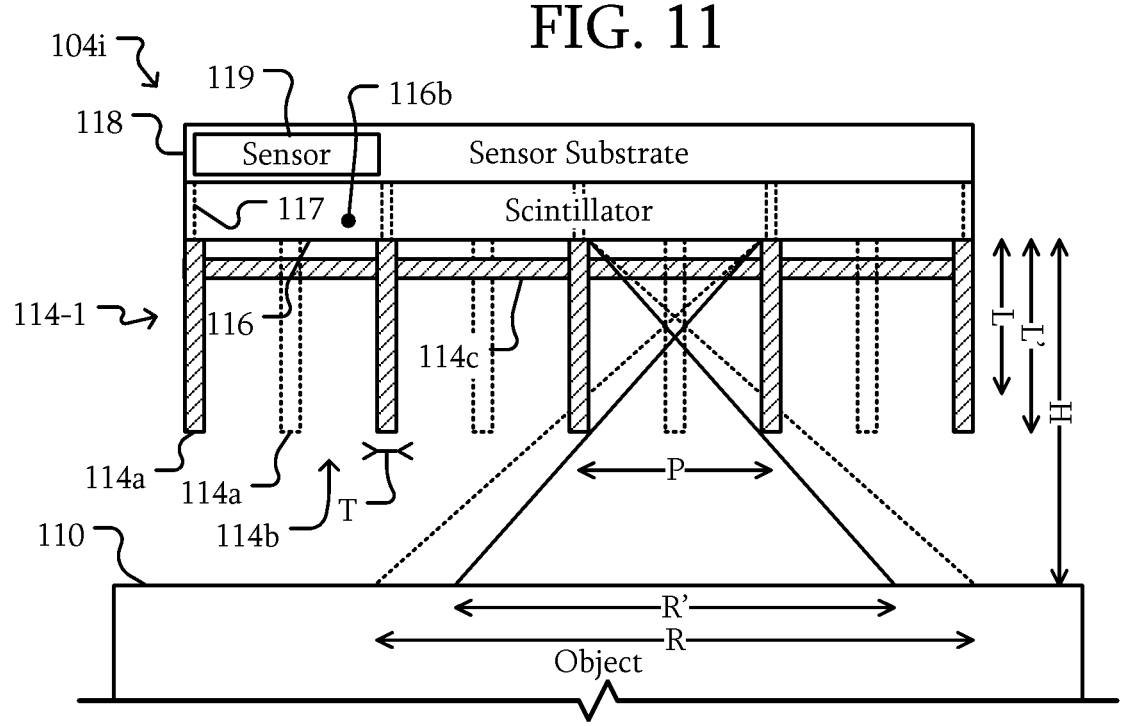
FIG. 11 is a block diagram of a backscatter detector with replaceable partitions according to some embodiments.

FIG. 11 is a block diagram of a backscatter detector with replaceable partitions according to some embodiments. The backscatter detector 104i may be similar to the backscatter detectors 104a-h described above. The backscatter detector 104i includes a collimator 114-1 that includes partitions 114a similar to the partitions 114a described above. However, the partitions 114a are mounted in a frame 114c. Although a sensor substrate 118 and a scintillator 116 are used as an example, in other embodiments, the backscatter detector 104i may include a DC sensor substrate 124 similar to the backscatter detector 104e.

The frame 114c is configured to accept the partitions 114a in a variety of positions and/or sizes. For example, some partitions 114a are illustrated with dashed lines to show that those partitions 114a may not be present. In some embodiments, partitions 114a may be placed in the frame 114c in those locations.

In some embodiments, the partitions 114a may be replaced with partitions 114a having a greater length. For example, the length L of the partitions 114a of the backscatter detector 104a is shown for comparison with the length L' of the partitions 114a of the backscatter detector 104i. The change in length in this example narrows the resolution to R', which is smaller than the resolution R associated with backscatter detector 104a. In other embodiments, the length L' may be smaller and the resolution R' may be correspondingly larger.

Figure 12A:
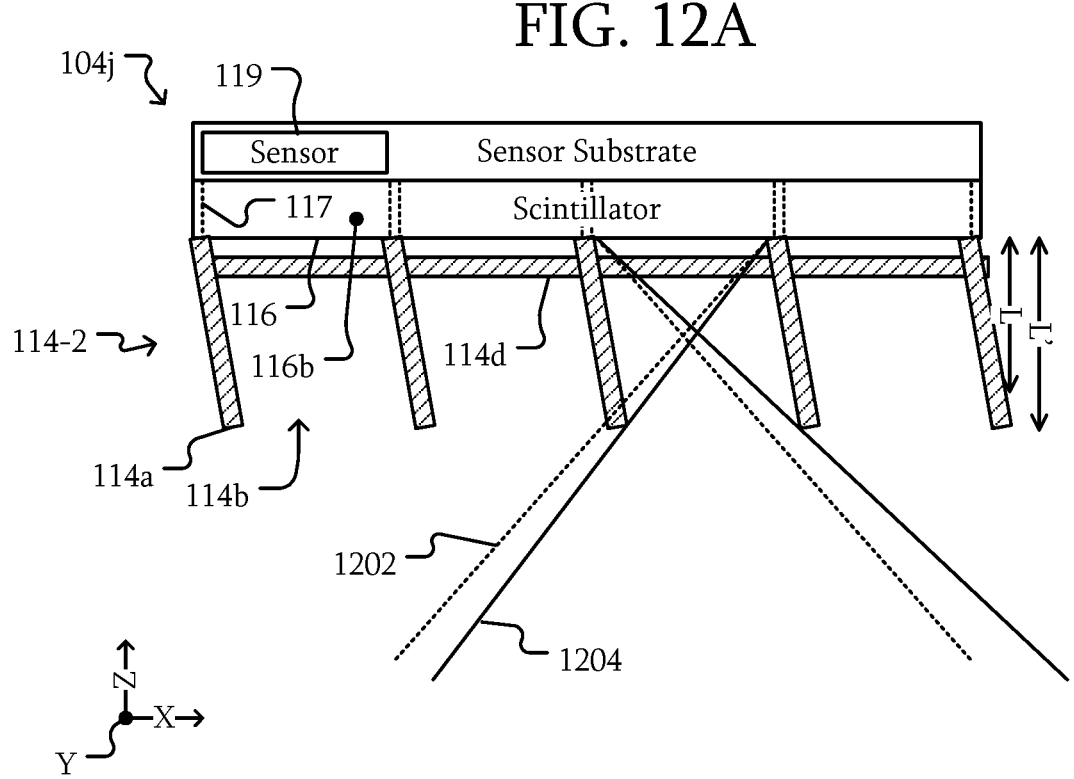
FIGS. 12A-12B are block diagrams of a backscatter detector with rotatable partitions according to some embodiments.
Figure 12B:
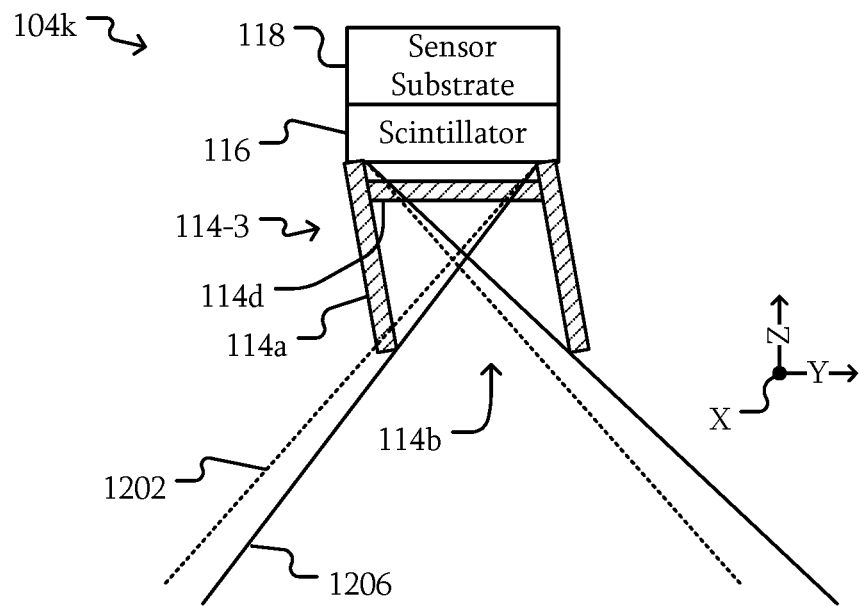

FIG. 12A-12B are block diagrams of backscatter detectors with rotatable partitions according to some embodiments. Referring to FIGS. 12A, the backscatter detector 104j may be similar to the backscatter detectors 104a-i described above. The backscatter detector 104j includes a collimator 114-2 that includes partitions 114a similar to the partitions 114a described above. However, the partitions 114a are mounted in a frame 114d that allows the partitions 114a to be rotated (e.g., in the X-direction or about axis X). Although a sensor substrate 118 and a scintillator 116 are used as an example, in other embodiments, the backscatter detector 104j may include a DC sensor substrate 124 similar to the backscatter detector 104e. Referring to FIG. 12B, the backscatter detector 104k may be similar to the backscatter detector 104j; however, the partitions 114a may be rotatable in a different direction (e.g., in the Y-direction or about axis Y).

Referring to FIGS. 12A and 12B, in some embodiments, by rotating the partitions 114a, the angle of the accepted incoming radiation may be changes. For example, the angle of acceptance 1202 of the backscatter detector 104j is due to the partitions 114a being in a position similar to that of backscatter detector 104a. By rotating the partitions 114a about axis Y, a new the angle of acceptance 1204 may be formed. Similarly, the angle of acceptance 1202 of the backscatter detector 104k may be similar to that of backscatter detector 104a. By rotating the partitions about axis X, a new the angle of acceptance 1206 may be formed. In some embodiments, by changing the angle, the depth or other position within an object 110 from which the backscattered radiation is received may be adjusted without moving the backscatter detector 104.

Figure 13A:
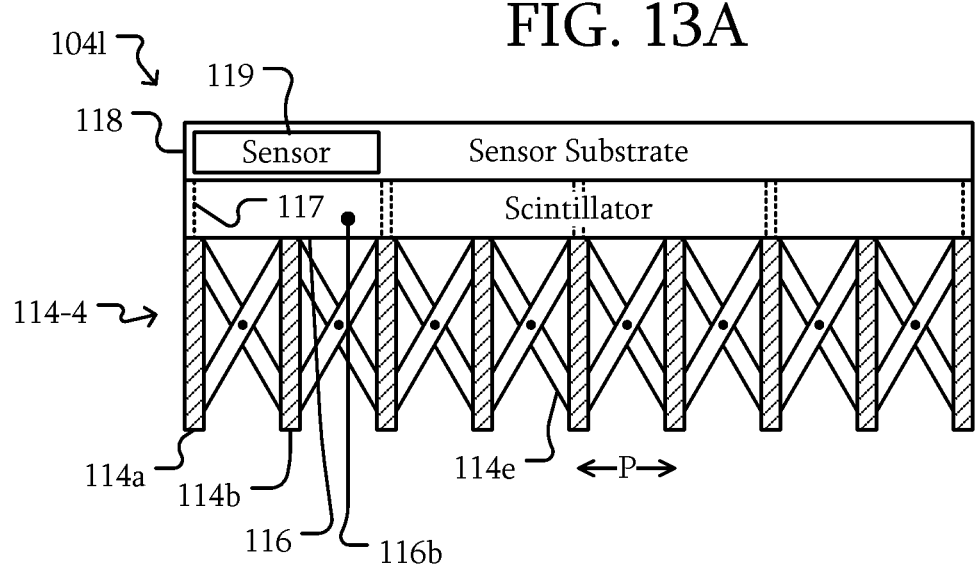
FIGS. 13A-13B are block diagrams of backscatter imaging systems with an expandable collimator according to some embodiments.
Figure 13B:
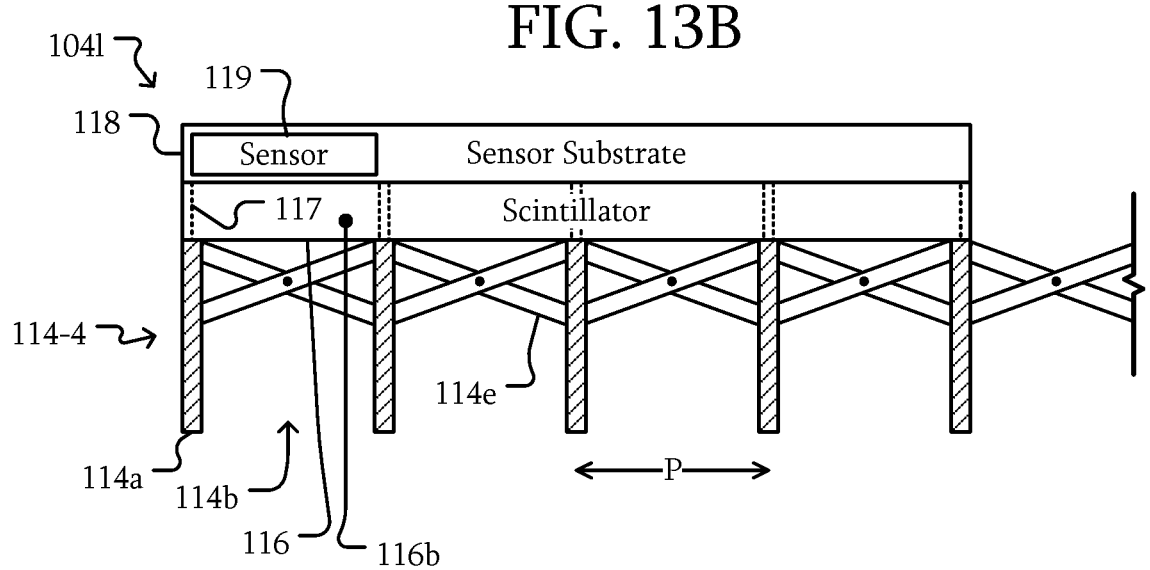

FIGS. 13A-13B are block diagrams of backscatter imaging systems with an expandable collimator according to some embodiments. The backscatter detector 104l may be similar to the backscatter detectors 104a-k described above. The backscatter detector 104l includes a collimator 114-4 that includes partitions 114a similar to the partitions 114a described above. However, the collimator 114-4 includes a frame 114e, including such features as pantograph supports, scissor mechanism, criss-cross X pattern structure, or the like, configured to move the partitions 114a. Although a sensor substrate 118 and a scintillator 116 are used as an example, in other embodiments, the backscatter detector 104i may include a DC sensor substrate 124 similar to the backscatter detector 104e. FIG. 13A illustrates the collimator 114-4 in a first position. FIG. 13B illustrates the collimator 114-4 in a second position that is expanded along the X axis. Accordingly, the pitch P may be adjusted.

Figure 14:
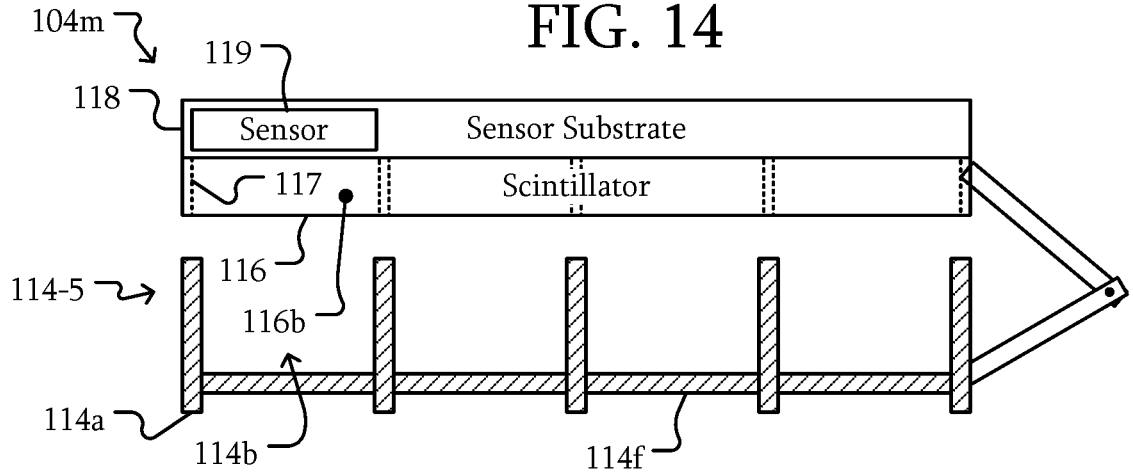
FIG. 14 is a block diagram of a backscatter detector with a movable collimator according to some embodiments.

FIG. 14 is a block diagram of a backscatter detector with a movable collimator according to some embodiments. The backscatter detector 104m may be similar to the backscatter detectors 104a-l described above. The backscatter detector 104m includes a collimator 114-5 that includes partitions 114a similar to the partitions 114a described above. However, the collimator 114-5 includes a frame 114f that is movable relative to the sensor substrate 118 and scintillator 116. The frame 114f may be movable using an arm and hinge mechanism or the like. Although a sensor substrate 118 and a scintillator 116 are used as an example, in other embodiments, the backscatter detector 104i may include a DC sensor substrate 124 similar to the backscatter detector 104e.

In some embodiments, the collimator 114-5 may be movable along the Z axis. The frame 114f may be configured to translate the partitions 114a along the Z axis. Accordingly, the partitions 114a may be effectively shortened or lengthened similar to changing the partitions 114 as in backscatter detector 104i without replacing the partitions 114a.

The various backscatter detectors 104a-m described above may be part of a corresponding x-ray system 100a-m.

The structures, devices, methods, and systems described and illustrated may be used in a variety of x-ray backscatter applications, such as NDT applications and cargo screening applications, including systems using rail, mobile, portal, gantry, or fixed systems.

Some embodiments include an x-ray system 100, 100a-1, comprising: a backscatter detector 104, 104a-m, comprising: an x-ray conversion material 116, 124; a plurality of sensors 119, 119' configured to generate electrical signals in combination with the x-ray conversion material 116, 124 in response to incident x-rays; and a collimator 114, 114-1 to 114-5 disposed on the x-ray conversion material 116, 124 and including a plurality of partition 114a extending away from the x-ray conversion material 116, 124 and the sensors 119, 119' and forming a plurality of openings, each opening corresponding to one of the sensors 119, 119'.

In some embodiments, the x-ray system 100, 100a-1 further comprises: a scintillator 116 including the x-ray conversion material 116, 124; wherein the collimator 114, 114-1 to 114-5 is disposed on a surface of the scintillator 116.

In some embodiments, the x-ray system 100, 100a-1 further comprises: a plurality of septa 117 disposed in the scintillator 116; wherein the collimator 114, 114-1 to 114-5 is separate from the septa 117.

In some embodiments, the scintillator 116 has a thickness such that a conversion rate for photon energies above 1 megaelectronvolt (MeV) is less than 50%.

In some embodiments, the scintillator 116 is selected from the group consisting essentially of: a cesium iodide (CsI) scintillator 116 having a thickness between 5 to 17 millimeters (mm); a cadmium tungstate (CdWO$_4$) scintillator 116 having a thickness between 1.5 to 7 mm; and a polyvinyl toluene (PVT) scintillator 116 having a thickness between 25 to 60 mm.

In some embodiments, the x-ray system 100, 100a-1 further comprises: a megavolt (MV) x-ray source 102, 102' configured to generate a MV x-ray beam; wherein the backscatter detector 104, 104a-m is disposed to receive photons generated during scattering events from the MV x-ray beam.

In some embodiments, the MV x-ray beam is a MV x-ray fan beam.

In some embodiments, the backscatter detector 104, 104a-m further comprises a back shield 120a disposed between the backscatter detector 104, 104a-m and the MV x-ray source 102, 102'.

In some embodiments, the back shield 120a is configured to reduce a conversion rate for photons having energies above 1 megaelectronvolt (MeV) to less than $1 \times 10^{-6}$.

In some embodiments, the backscatter detector 104, 104a-m further comprises a side shield 120b; and the side shield 120b is thinner than the back shield 120a.

In some embodiments, the x-ray system 100, 100a-1 further comprises: a transmission detector 104, 104a-m configured to receive at least part of the MV x-ray beam.

In some embodiments, the length (L) and pitch (P) of the partition 114a are related to a target resolution (R) and an offset (H) from an object 110 by the equation:

$$R = \frac{PH}{L} - \frac{1}{2}.$$

In some embodiments, the backscatter detector 104, 104a-m is one of a plurality of backscatter detector 104, 104a-ms disposed in relation to each other to detect backscatter from different depths within an object 110.

In some embodiments, the sensors 119, 119' are direct conversion sensors 119, 119' including the x-ray conversion material 116, 124.

In some embodiments, the collimator 114, 114-1 to 114-5 includes a frame; and the partition 114a are removably mounted in the frame 114c.

In some embodiments, the collimator 114, 114-1 to 114-5 includes a frame; and the partition 114a are rotatable by the frame 114d.

In some embodiments, the collimator 114, 114-1 to 114-5 includes a frame; and the pitch of the partition 114a is adjustable by the frame 114e.

In some embodiments, the collimator 114, 114-1 to 114-5 includes a frame; and the distance of the partition 114a from the sensors 119, 119' is adjustable by the frame 114f.

Some embodiments include a method, comprising: generating a megavolt (MV) x-ray beam; backscattering the MV x-ray beam towards a backscatter detector 104, 104a-m; collimating the backscattered MV x-ray beam; filtering energies above 1 megaelectronvolts (MeV) at the backscatter detector 104, 104a-m; and detecting the backscattered MV x-ray beam.

In some embodiments, filtering energies above 1 MeV at the backscatter detector 104, 104a-m comprises: detecting the backscattered MV x-ray beam to generate a signal; and rejecting portions of the signal based on energy level of the received photons.

In some embodiments, filtering energies above 1 MeV at the backscatter detector 104, 104a-m comprises: shielding the backscatter detector 104, 104a-m from leakage from a source of the MV x-ray beam.

In some embodiments, filtering energies above 1 MeV at the backscatter detector 104, 104a-m comprises: converting photons of the MV x-ray beam in a scintillator 116 such that a conversion rate for photon energies above 1 MeV is less than 50%.

Some embodiments include an x-ray system 100, 100a-1, comprising: means for generating a megavolt (MV) x-ray beam; means for detecting backscatter from the MV x-ray beam; means for filtering photons having energies above 1 megaelectronvolts (MeV) before detection in the means for detecting the backscatter from the MV x-ray beam.

Examples of the means for generating a megavolt (MV) x-ray beam include the x-ray source 102 or the like. Examples of the means for detecting backscatter from the MV x-ray beam include the sensor substrate 118, the scintillator 116, the DC sensor substrate 124, the sensors 119 or 119', or the like. Examples of the means for filtering photons having energies above 1 megaelectronvolts (MeV) before detection in the means for detecting the backscatter from the MV x-ray beam include the collimator 114, 114-1 to 114-5 optionally with the scintillator 116 and/or the DC sensor substrate 124 and sensors 119', or the like.

In some embodiments, the x-ray system 100, 100a-1 further comprises: means for collimating the backscatter from the MV x-ray beam before detection in the means for detecting the backscatter from the MV x-ray beam. Examples of the means for collimating the backscatter from the MV x-ray beam before detection in the means for detecting the backscatter from the MV x-ray beam include the collimator 114, 114-1 to 114-5, or the like.

In some embodiments, the x-ray system 100, 100a-1 further comprises: means for detecting transmission photons from the MV x-ray beam. Examples of the means for detecting transmission photons from the MV x-ray beam include the transmission detector 112 disposed relative to the MV x-ray source 102.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. An x-ray system, comprising:
a backscatter detector, comprising:
an x-ray conversion material;
a plurality of sensors configured to generate electrical signals in combination with the x-ray conversion material in response to incident x-rays; and
a collimator disposed on the x-ray conversion material and including a plurality of partitions extending away from the x-ray conversion material and the sensors and forming a plurality of openings, each opening corresponding to one of the sensors;
wherein:
each of the openings is associated with a set of one or more sensors of the sensors that is different from sets of sensors associated with the other openings; and
a length (L) and a pitch (P) of the partitions are related to a target resolution (R) and an offset (H) from an object by an equation:

$$R = \frac{PH}{L} - \frac{1}{2}.$$

2. The x-ray system of claim 1, further comprising:
a scintillator including the x-ray conversion material;
wherein the collimator is disposed on a surface of the scintillator.

3. The x-ray system of claim 2, further comprising:
a plurality of septa disposed in the scintillator;
wherein the collimator is separate from the septa.

4. The x-ray system of claim 2, wherein:
the scintillator has a thickness such that a conversion rate for photon energies above 1 megaelectronvolt (MeV) is less than 50%.

5. The x-ray system of claim 2, wherein:
the scintillator is selected from a group consisting essentially of:
a cesium iodide (CsI) scintillator having a thickness between 5 to 17 millimeters (mm);
a cadmium tungstate ($CdWO_4$) scintillator having a thickness between 1.5 to 7 mm; and
a polyvinyl toluene (PVT) scintillator having a thickness between 25 to 60 mm.

6. The x-ray system of claim 1, further comprising:
a megavolt (MV) x-ray source configured to generate a MV x-ray beam;
wherein the backscatter detector is disposed to receive photons generated during scattering events from the MV x-ray beam.

7. The x-ray system of claim 6, wherein:
the MV x-ray beam is a MV x-ray fan beam.

8. The x-ray system of claim 6, wherein:
the backscatter detector further comprises a back shield disposed between the backscatter detector and the MV x-ray source.

9. The x-ray system of claim 8, wherein:
the back shield is configured to reduce photons having energies above 1 megaelectronvolt (MeV) from the MV x-ray source to less than $1 \times 10^{-6}$.

10. The x-ray system of claim 8, wherein:
the backscatter detector further comprises a side shield; and
the side shield is thinner than the back shield.

11. The x-ray system of claim 6, further comprising:
a transmission detector configured to receive at least part of the MV x-ray beam.

12. The x-ray system of claim 1, wherein:
the backscatter detector is one of a plurality of backscatter detectors disposed in relation to each other to detect backscatter from different depths within an object.

13. The x-ray system of claim 1, wherein:
the sensors are direct conversion sensors including the x-ray conversion material.

14. The x-ray system of claim 1, wherein:
the collimator includes a frame; and
optionally at least one of:
  the partitions are removably mounted in the frame;
  the partitions are rotatable by the frame;
  a pitch of the partitions is adjustable by the frame; and
  a distance of the partitions from the sensors is adjustable by the frame.

15. A method of operating the x-ray system of claim 1, comprising:
generating a megavolt (MV) x-ray beam;
backscattering the MV x-ray beam towards the backscatter detector;
collimating the backscattered MV x-ray beam at the backscatter detector;
filtering energies above 1 megaelectronvolts (MeV) at the backscatter detector; and
detecting the backscattered MV x-ray beam.

16. The method of claim 15, wherein filtering energies above 1 MeV at the backscatter detector comprises:
detecting the backscattered MV x-ray beam to generate a signal; and
rejecting portions of the signal based on energy levels of the received photons.

17. The method of claim 15, wherein filtering energies above 1 MeV at the backscatter detector comprises:
shielding the backscatter detector from leakage from a source of the MV x-ray beam.

18. The method of claim 15, wherein filtering energies above 1 MeV at the backscatter detector comprises:
converting photons of the MV x-ray beam in a scintillator such that a conversion rate for photon energies above 1 MeV is less than 50%.

19. The x-ray system of claim 1, wherein:
the backscatter detector further comprises a filter disposed on the scintillator between the backscatter detector and the object.

20. An x-ray system, comprising:
an x-ray source for generating a megavolt (MV) x-ray beam;
a backscatter detector for detecting backscatter from the MV x-ray beam; and
means for filtering photons from the MV x-ray beam having energies above 1 megaelectronvolts (MeV) before detection in the backscatter detector, the means for filtering photons comprising:
  a collimator including a plurality of partitions forming a plurality of openings, a length (L) and a pitch (P) of the partitions being related to a target resolution (R) and an offset (H) from an object by an equation:

$$R = \frac{PH}{L} - \frac{1}{2}.$$

* * * * *